Feb. 1, 1938.  A. B. CADMAN  2,106,717
BRAKE
Filed Nov. 1, 1935  2 Sheets-Sheet 2
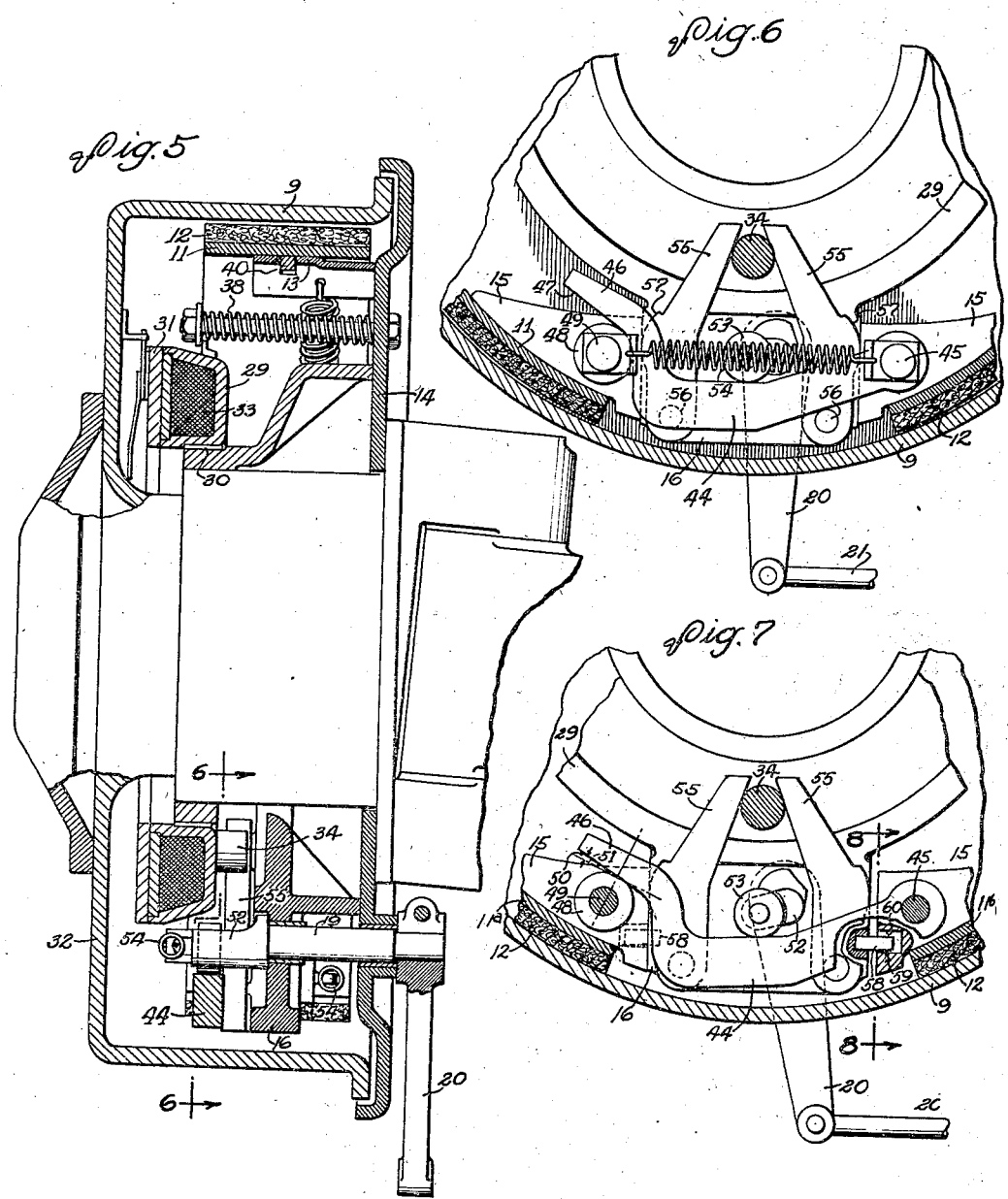
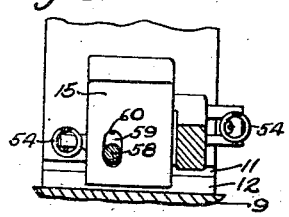
INVENTOR
Addi B. Cadman
BY
Parker, Carlson, Pfgene Hubbard
ATTORNEYS Patented Feb. 1, 1938

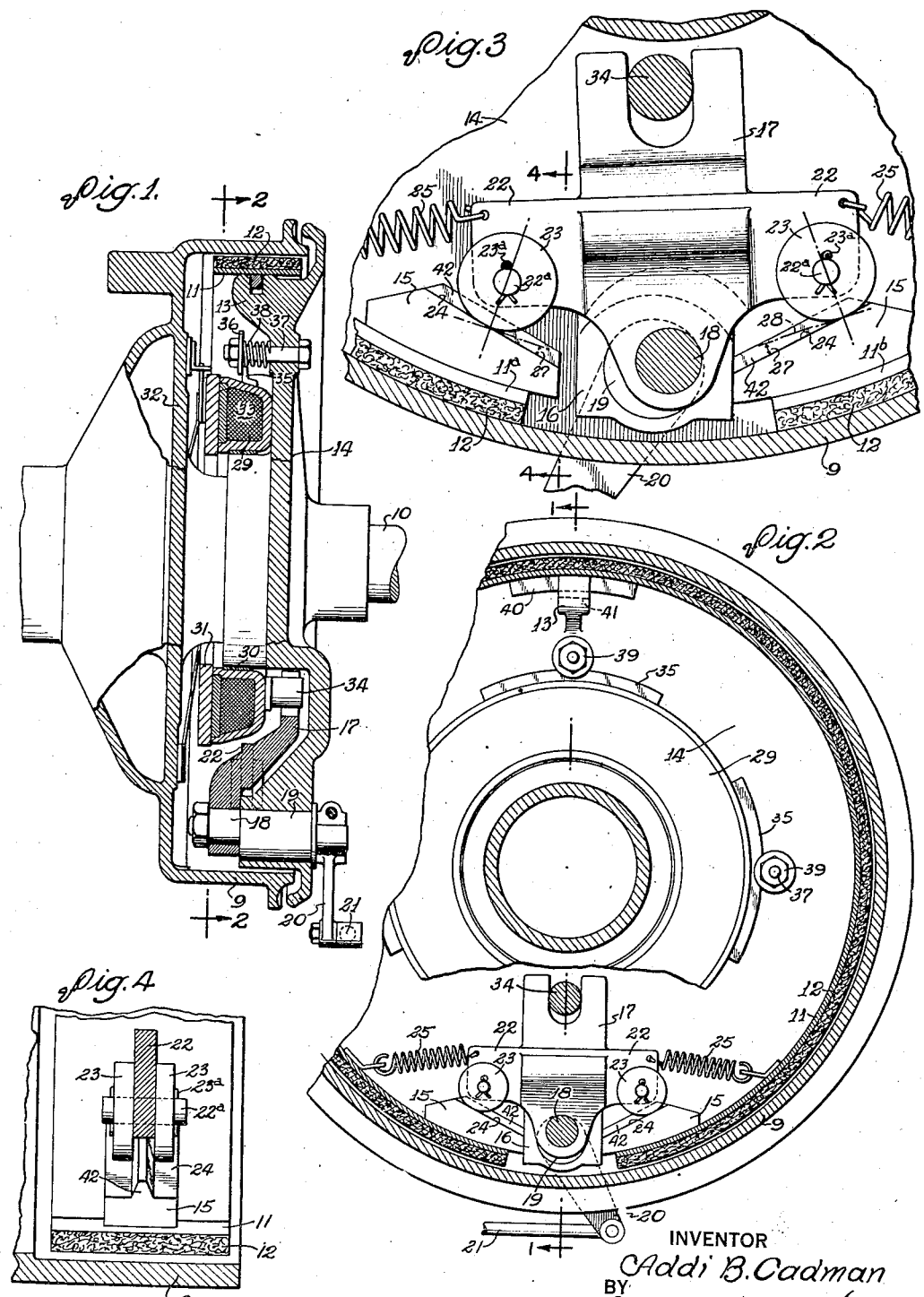

2,106,717

UNITED STATES PATENT OFFICE 2,106,717

BRAKE

Addi Benjamin Cadman, Beloit, Wis.

Application November 1, 1935, Serial No. 47,868

8 Claims. (Cl. 188—138)

This invention relates generally to friction brakes of the character used on automotive vehicles, and more particularly to a brake of the type in which a wrapping or self-energizing action is built up when the brake is applied.

One object of the invention is to provide in a brake of the above general character a novel means for applying the actuating pressure so that the wrapping action may build up properly throughout the entire circumference of the rotatable brake element.

The invention also resides in the novel character of the pressure applying mechanism and the construction thereof which permits the brake to be actuated by more than one operator.

Another object is to provide a self-energizing brake in which the pressure for initiating the self-energizing action is applied in a manner such as to avoid the possibility of the non-rotatable braking element becoming wedged against the intended self-energizing movement.

Still another object is to provide a self-energizing brake in which the point of maximum pressure between the engaging friction surfaces is shifted circumferentially as the surfaces wear whereby to provide for more even distribution of wear.

A further object is to provide in a self-energizing brake a novel means for preventing lateral shifting of the non-rotatable braking element when the latter is in engagement with the drum surface.

Other objects and advantages of the invention will become apparent from the following detailed description taken in connection with the accompanying drawings, in which Figure 1 is a sectional view of a vehicle brake embodying the features of the present invention, the section being taken along the line 1—1 of Fig. 2.

Fig. 2 is a fragmentary sectional view taken along the line 2—2 of Fig. 1, the parts being in brake-released position.

Fig. 3 is an enlarged view of a portion of Fig. 2 showing the parts in brake-applied positions.

Fig. 4 is a fragmentary sectional view taken along the line 4—4 of Fig. 3.

Fig. 5 is a sectional view similar to Fig. 1 showing a modified form of brake.

Figs. 6 and 7 are fragmentary sectional views taken along the line 6—6 of Fig. 5 and showing the parts in brake-released and brake-applied positions respectively.

Fig. 8 is a fragmentary section taken along the line 8—8 of Fig. 7.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is embodied in a vehicle brake of the internal expanding type having a rotatable friction element in the form of a drum 9 rotatably supported from a vehicle axle 10. The non-rotatable braking member is of the band type comprising a flexible strip 11 of metal to which are riveted or otherwise secured segments 12 of suitable friction material. The band encircles and is supported for longitudinal movement by means including a lug 13 on a non-rotatable anchor plate 14 which closes the open end of the drum. In the present instance, the band encircles the entire internal cylindrical surface of the drum with its ends disposed adjacent each other and carrying rigid brackets 15 arranged to abut against opposite sides of a stop 16 integral with and projecting inwardly from the anchor plate 14.

In the brakes illustrated, brake actuating force is applied to the ends of the band by either of two independently operable actuators, one of which is a power operator and the other of which is adapted for manual operation. The manual operator comprises an equalizing bar adapted for bodily outward movement and having its opposite ends connected with the ends of the band in a manner such as to permit freedom of movement of one of the band ends away from the stop 16 when the actuating pressure is applied.

Referring now to the form shown in Figs. 1 to 4, the equalizing bar includes a lever 17 pivoted on an eccentric stud 18 rigid with a shaft 19 which is journaled in the anchor plate 14 and carries an external crank arm 20 which may be oscillated through the medium of a link 21 in any preferred way. Projecting laterally from the lever 17 are arms 22 which carry pins 22ª on which pairs of spaced rollers 23 are held by cotter pins 23ª. The rollers 23 bear against surfaces 24 formed on the brackets 15 and extending in a generally circumferential direction.

Owing to the eccentricity of the stud 18, it will be observed that when the operating lever 20 is swung in either direction from the normal brake-released position shown in Fig. 2, the equalizing bar formed by the lever 17 and the arms 22 will be moved bodily in an outward radial direction so that the rollers 23 acting through the medium of the brackets 15 will press the end portions of the band outwardly against the drum. Assuming that the drum is rotating in a clockwise direction, the friction force applied to the band by the drum when the segments 12 contact the internal drum surface will force the end 11ᵇ of the band toward the stop 16 and carry the end 11ᵃ away from the stop as shown in Fig. 3. As a result, a wrapping or self-energizing action will be built up throughout the length of the band thereby increasing the effective braking action in a manner well understood in the art. When the actuating force is relieved, contractile springs 25 acting between the band 11 and the arms 22 operate to return the equalizing bar to the normal brake-released position shown in Fig. 2. The parts operate in the same way when the crank arm 20 is actuated with the drum rotating in a counter-clockwise direction. In this case, the band end 11ᵃ anchors against the stop 16 and the end 11ᵇ moves with the drum away from the stop.

In the movement of the actuated end of the band away from the stop 16, one of the rollers 23 rides along the surface 24 of the bracket. To insure freedom of movement of the actuated end of the band and avoid the possibility of a reduction in the effective braking force by a wedging of the band end and bracket between the drum and the active roller 23, the surface 24 is disposed at a small angle 27 relative to a tangent 28 to the roller 23 at the point of contact between this roller and the surface 24. By virtue of this arrangement, the roller will continue to move outwardly as the band end continues to move away from the stop. In this way, the possibility of the movable band end becoming held against circumferential movement by the actuating mechanism is effectually overcome and the necessity for forming the surfaces 24 and locating them with a high degree of accuracy in manufacture of the brake is avoided.

In the present instance, the power actuator for the brake is of the momentum type comprising an annular magnet ring 29 mounted to oscillate on a bearing 30 on the anchor plate 14 and adapted when energized to attract an armature ring 31 rotatable with the drum and supported for yielding axial movement by the inturned flange 32 of the drum. It will be apparent that when the magnet winding 33 is energized, the magnet will grip the armature and turn therewith. This movement is communicated to the lever 17 through the medium of a stud 34 projecting rigidly from the back of the magnet into the bifurcated free end of the lever 17. The resulting oscillation of the lever 17 about the stud 18, which at this time remains fixed, applies an outward pressure to one end or the other of the band depending on the direction of oscillation of the magnet. This results in expansion of the band in the manner above described, it being apparent that after the clearance between the band and drum have been taken up, slippage occurs between the magnet and armature, the brake being held set so long as the magnet remains energized. When the magnet is deenergized, the springs 25 act to restore the band, the lever 17 and the magnet to the normal brake-released position.

To maintain the magnet ring 29 in proper axial position relative to its bearing support, outwardly projecting radial ribs 35 are secured to the magnet and are adapted to bear in all angular positions of the magnet against a shoulder formed by a washer 36 mounted on a bolt 37 which extends through the anchor plate and carries a spring 38 pressing the washer against an adjusting nut 39.

To insure more even wearing of the friction material surfaces and to avoid wear on the band supports such as might be occasioned by lateral weaving of the band under the action of spiral grooves which sometimes form in the drum surface, means is provided at circumferentially spaced points along the band for holding the band against lateral movement while at the same time permitting of the longitudinal movement incident to application of the brake. One of these means comprises an elongated lug 40 rigid with the band 11 near the center thereof and seated in a groove 41 formed in the lug 13 of the anchor plate.

The guide means at the ends of the band comprises a rib 42 rigid with each bracket 15 and upstanding from and extending longitudinally of the bearing surface 24 between the spaced sections of the rollers 23. Since the lever 17 is held by the shaft 19 and the nut 43 against axial movement, the ends of the band will also be held against lateral movement by virtue of the engagement between the rollers 23 and the ribs 42.

In the modified form of brake shown in Figs. 5 to 8, the parts are numbered to correspond to Figs. 1 to 4, and the equalizing bar is in the form of a lever 44 pivoted on a pin 45 on the bracket 15 on one end of the band. The free end 46 of the lever is formed with a surface 47 which bears against a roller 48 on a pin 49 carried by the other bracket 15. As in the case of the surfaces 24, the surface 47 is inclined at an angle 50 relative to a tangent 51 so as to permit free movement of the band end 11ᵃ away from the stop 16 when the brake is applied with the drum rotating in a clockwise direction. By virtue of the bearing engagement between the roller 48 and the surface 47, movement of the band end 11ᵇ away from the stop 16 when the brake is applied with the drum rotating in the opposite direction is also permitted.

The operating shaft 19 of this brake carries a short crank arm 52 on which is supported a roller 53 bearing against a surface 44 intermediate the ends of the lever 44. Thus, when the lever 20 is moved from the brake-released position (Fig. 6) in the actuated position (Fig. 7), the equalizing lever 44 will be moved bodily in an outward radial direction thereby distributing the actuating force to opposite ends of the band. If the drum is rotating in a counter-clockwise direction, the band end 11ᵇ will move away from the stop 16 as indicated in Fig. 7, the surface 47 riding along the roller 48. When the actuating force is relieved, springs 54 acting between the brackets 15 operate to restore the parts to their released position shown in Fig. 6.

In the modified form of brake, the oscillatory movement of the stud 34 on the magnet is communicated to one end or the other of the brake through the medium of levers 55 pivoted on studs 56 carried by the stop 16 and formed intermediate their ends with cam surfaces 57 which bear against the flattened ends of the band brackets 15. Thus, when the magnet is energized and the stud 34 moves out of brake-released position, one or the other of the levers 55, according to the direction of rotation of the drum, will be moved to expand the band.

In brakes of the character above described, it will be apparent that the wrapping or self-energizing action builds up progressively throughout the length of the band beginning at the point of application of the actuating force. As a result, the radial pressure between the band and the drum increases progressively along the band beginning at the point of application of the actuating force, the maximum radial pressure being applied at the anchored end of the band; consequently there is a tendency for the friction material on the latter end to wear off more rapidly.

The present invention contemplates prolonging the service life of the braking element by shifting the point of maximum radial pressure circumferentially along the braking element as the latter wears. To this end, means is provided for limiting the outward radial movement of the anchored end of the band after the friction segment 12 carried by this end has worn down to a predetermined permissible degree. In the present instance, this means comprises a pin 58 projecting rigidly from the surface of the stop 16 against which the band bracket 15 abuts into a recess 59 in the bracket. The recess is elongated in a radial direction as shown in Figs. 7 and 8, so that as the friction material 12 at the end of the band wears off, the wall 60 of the slot 59 moves closer to the pin 58. When the two engage, further outward radial movement of the band end will be prevented with the result that in subsequent applications of the brake the point of maximum pressure application will be shifted along the band away from the stop 16. In this way, wear on that end portion of the band which anchors when the brake is applied with the vehicle moving forwardly is distributed more evenly thereby prolonging the service life of the band segments. Preferably, the bracket 15 on the other end of the band is also formed with a slot 59 so that the position of the band in the drum may be reversed after one end has worn off to the permissible degree.

I claim as my invention:

1. A friction brake comprising, in combination, a rotatable drum, a fixed stop disposed adjacent the internal drum surface, a friction band extending around the internal surface of said drum with its ends disposed on opposite sides of and normally drawn into abutment with said stop, a lever swingable about a pivot adjacent said drum and disposed substantially radially when in brake-released position, oppositely projecting arms rigid with said lever intermediate the ends thereof and having bearing engagement with the opposite end portions of said band whereby one or the other of said end portions will be pressed outwardly against the drum according to the direction of oscillation of said lever, an operating member for said lever pivotally connected to the free end thereof and mounted for oscillation about the drum axis, and auxiliary actuating means operable to shift the pivot of said lever outwardly toward said drum surface.

2. A friction brake comprising, in combination, a rotatable drum, a fixed stop disposed adjacent the internal drum surface, a friction band extending around the internal surface of said drum with its ends disposed on opposite sides of and normally drawn into abutment with said stop, a lever swingable about a fixed pivot disposed adjacent said drum, contractile springs acting between said lever and the end portions of said band to maintain the lever substantially in a radial brake-released position, means on said lever having bearing engagement with the opposite end portions of said band whereby one or the other of said end portions will be pressed outwardly in a generally radial direction against the drum according to the direction of oscillation of said lever, and an operating member for swinging said lever about said pivot.

3. A friction brake comprising, in combination, a rotatable drum, a fixed stop disposed adjacent the internal drum surface, a friction band extending around the internal surface of said drum with its ends disposed on opposite sides of and normally drawn into abutment with said stop, a lever swingable about a pivot supported by said stop adjacent said drum and disposed substantially radially when in brake-released position, oppositely projecting arms rigid with said lever intermediate the ends thereof and having bearing engagement with the opposite end portions of said band whereby one or the other of said end portions will be pressed outwardly against the drum according to the direction of oscillation of said lever, and an operating member for said lever pivotally connected to the free end thereof and mounted for oscillation about the drum axis.

4. A self-energizing friction brake having, in combination, a rotatable drum, a flexible band extending around the internal cylindrical surface of said drum, an anchor for one end of the band, means to press the other end against the drum surface whereby to cause a self-energizing action to be built up through the band, and means to limit the outward movement of the anchored end of the band after the friction surface thereon has worn down to a predetermined extent whereby to shift the point of maximum pressure application away from said anchor end.

5. A self-energizing friction brake having, in combination, a rotatable drum, a flexible band extending around the internal cylindrical surface of said drum, a stop interposed between adjacent ends of said band, actuating means associated with said ends to press one end or the other against said drum surface according to the direction of drum rotation and cause the other end to anchor against said stop, interengaging surfaces on said stop and one end of said band acting to limit the outward radial movement of such end and thereby shift the point of maximum pressure application away from said end after the surface of the latter has been worn to a predetermined degree, and means on the other end of said band adapted for interengagement with said stop in a similar way when the position of the band in said drum is reversed.

6. A self-energizing friction brake having, in combination, a rotatable drum, an elongated relatively flexible element extending along the internal drum surface and carrying a layer of friction material, means for anchoring one end of said element against circumferential movement in one direction, operating means by which the other end portion may be pressed against said drum surface to initiate the building up of a self-energizing action throughout said element, and means associated with the anchored end and operating to permit a limited outward radial movement thereof less than the thickness of said layer whereby to shift the point of maximum radial pressure along said element away from said anchoring means.

7. A self-energizing friction brake having, in combination, a rotatable drum, an elongated relatively flexible element extending along the internal drum surface, a stop against which one end of said element abuts when the element is expanded against said surface, and interengaging means on said stop and said anchored end acting to limit the outward radial movement of said anchored end after the friction surface thereof has been worn down to a predetermined degree.

8. A friction brake comprising, in combination, a rotatable drum, a relatively flexible member extending around the internal surface of said drum and carrying a layer of friction material adapted to be pressed against the drum surface upon expansion of said member, means for expanding said member, and means operating upon wearing off of said layer to a predetermined degree at one point around the drum to positively prevent further outward movement of said member at such point whereby to cause distribution of the effective expanding pressure to an adjacent portion of said layer spaced circumferentially from said point.

ADDI BENJAMIN CADMAN.